United States Patent
Martin

(10) Patent No.: US 7,040,843 B1
(45) Date of Patent: May 9, 2006

(54) FLOORING HOLLOW BACK RELIEF CUTTING TOOL AND METHOD

(75) Inventor: Russ L. Martin, Peshtigo, WI (US)

(73) Assignee: Great Lakes Custom Tool Mfg., Inc., Peshtigo, WI (US)

( * ) Notice: Subject to any disclaimer, the term of this patent is extended or adjusted under 35 U.S.C. 154(b) by 0 days.

(21) Appl. No.: 11/082,289

(22) Filed: Mar. 17, 2005

(51) Int. Cl.
*B23B 27/16* (2006.01)
*B23C 5/00* (2006.01)

(52) U.S. Cl. .......................... 407/35; 407/67; 407/113

(58) Field of Classification Search ................ 407/67, 407/102, 103, 104, 107, 108, 113, 35
See application file for complete search history.

(56) References Cited

U.S. PATENT DOCUMENTS

| | | | | |
|---|---|---|---|---|
| 5,810,518 A | * | 9/1998 | Wiman et al. | 407/102 |
| 6,050,751 A | * | 4/2000 | Hellstrom | 407/104 |
| 6,540,448 B1 | * | 4/2003 | Johnson | 407/35 |
| 6,796,750 B1 | * | 9/2004 | Men | 407/35 |

* cited by examiner

*Primary Examiner*—Willmon Fridie, Jr.
(74) *Attorney, Agent, or Firm*—Reinhart Boerner Van Deuren P.C.

(57) ABSTRACT

An indexable cutting insert, a tool using a plurality of such inserts, and a method of forming flat bottomed grooves in the backs of flooring planks. The tool is arranged to accept indexable inserts, and the indexable inserts are specially arranged such that each insert has four sets of cutting faces for forming a flat bottom groove with 45 degrees groove side walls. The insert is provided with a conical dished face on its unsupported side, and a mating conical faced nut is positioned in the dished face and receives a threaded fastener, preferably a cap screw, which projects through the tool body, through the insert aperture and into the nut to accurately lock the insert in indexed position in such a way that the head of the cap screw is substantially free of impacted cutting debris.

8 Claims, 4 Drawing Sheets

FLOORING HOLLOW BACK RELIEF CUTTING TOOL AND METHOD

FIELD OF THE INVENTION

This invention relates to woodworking tools, and more particularly to a tool for high volume production of flooring planks, particularly grooves in the backs of flooring planks.

BACKGROUND OF THE INVENTION

As is well known, grooves have been formed in the back of flooring planks for many years and by various methods for purposes well known in the art. Special purpose tools have been developed, but typically suffer from the problem of dulling, requiring resharpening.

BRIEF SUMMARY OF THE INVENTION

It is an object of the present invention to provide a tool for cutting grooves in the backs of flooring planks which utilizes specially configured indexable inserts, and which can provide four sets of cutting edges for forming grooves in the floor planks.

It is a related but important object to form the insert arrangement for cutting tools such that the insert is reliably mounted on the tool, and the fasteners which secure the inset are readily accessed, but are substantially free of impacted cutting debris.

A further object is the provision of an insert type cutting tool for the above purpose which is relatively inexpensive as compared to the numerous tools it would replace, and which is relatively easy to re-index to provide a new set of cutting edges.

Accordingly, the invention provides a cutting tool for forming flat bottomed grooves in the backs of flooring planks, which includes a tool body having a plurality of positions for supporting cutting inserts, and a plurality of cutting inserts supported on the tool body in the positions. Each cutting insert is shaped as a regular octagon having eight identical cutting edges relatively displaced by 45 degrees, and having A-edges alternating with B-edges. The cutting inserts are arranged such that when they are indexed in the tool body with an A-edge positioned cut the flat bottom of the groove, each of the adjacent B-edges is oriented to cut a 45 degree groove side wall. Each insert has a conical dished face on the unsupported side of the insert and an aperture in the dished face projecting through the insert. A matching conical faced nut is positioned in the dished face of the insert and a threaded fastener projects through the tool body, the insert and into the nut to accurately lock the insert to the tool body in indexed position. The threaded fastener is releasable to allow the tool to be re-indexed.

The invention also contemplates the insert itself combined with the conical nut and threaded fastener with the relative positions arranged such as to minimize collection of cutting debris in the socket of the cap screw or other threaded fastener.

The method of the invention includes utilizing a tool and cutting insert as described above, securing the cutting inserts to the tool by means of threaded fasteners arranged as described above, and rotating the tool body to create relative motion between the tool body and flooring planks to be grooved such that the A cutting edge in the indexed position cuts a flat bottomed groove, and with the adjacent B-edges engaged in the plank at no more than 50% of their cutting length. When the active cutting edges are worn, the method contemplate indexing the tool, and repeating the indexing step to utilize four independent sets of cutting edges.

Other aspects, objectives and advantages of the invention will become more apparent from the following detailed description when taken in conjunction with the accompanying drawings.

While the invention we described in connection with a preferred embodiment, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
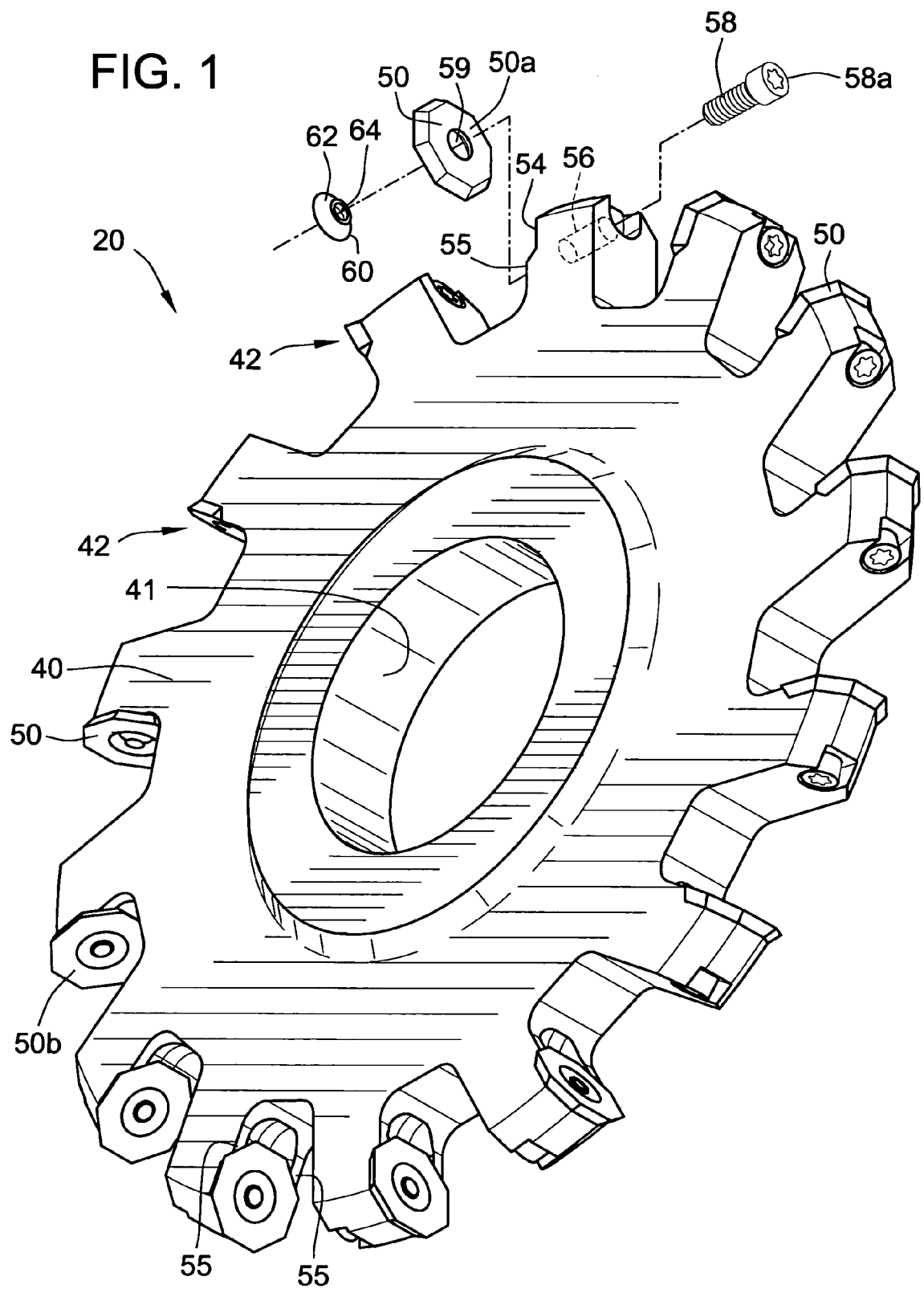
FIG. 1 is a perspective view of a cutting tool employing a plurality of cutting inserts exemplifying the present invention.
Figure 2:
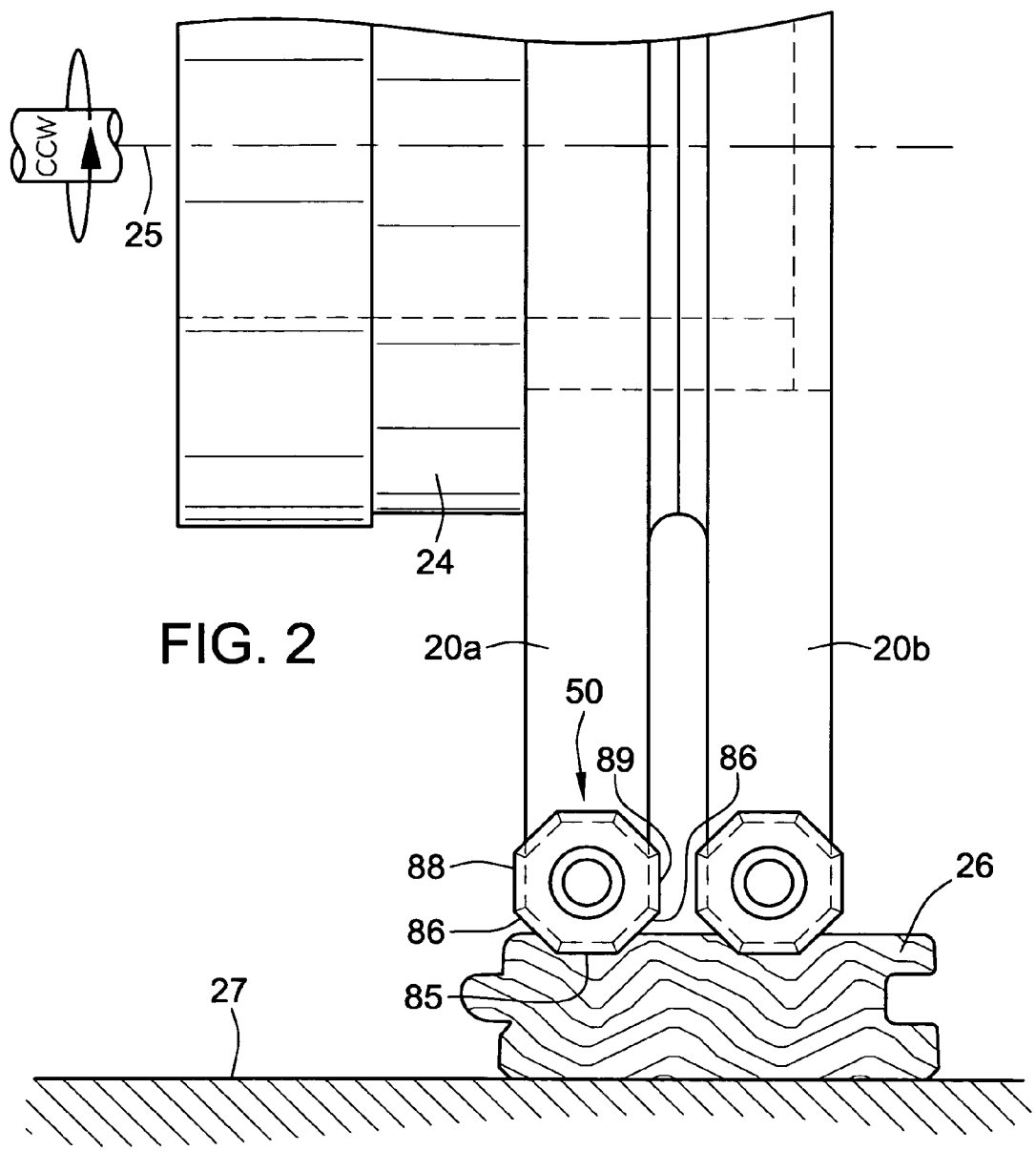
FIG. 2 is a partial cross-section of a pair of cutting tools of FIG. 1 mounted on a rotating arbor and engaging a flooring plank.
Figure 3:
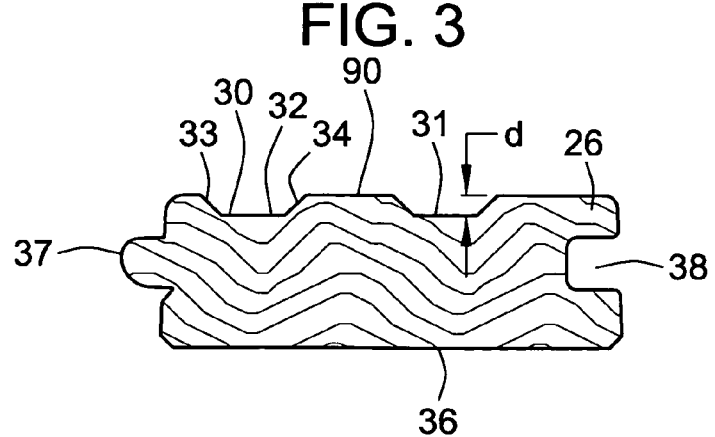
FIG. 3 is a cross-sectional view, similar to FIG. 2, of the machined and grooved flooring plank.

Turning now to the drawings, FIG. 1 shows a tool 20 exemplifying the present invention, and FIG. 2 shows a pair of such tools 20a, 20b mounted on a driven arbor 24 for rotation about the arbor axis 25 to cut elongate grooves in the bottom of a flooring plank 26 positioned on a machine bed 27. The machined plank 26 is shown in FIG. 3 and includes, in the illustrated example, a pair of grooves 30, 31 each having a flat bottom 32 and angled sides 33, 34. In the present example the sides 33, 34 form a 45 degrees angle with the flat bottom 32. The machined grooves 30, 31 are on the back of the plank, opposite the finished face 36. As is also conventional the plank will have a machined tongue 37 and machined groove 38 for conventional installation as tongue and groove flooring. The machine set up diagrammatically illustrated in FIG. 2 allows relative adjustment between the arbor center line 25 and the upper surface of the supporting table 27 to control the depth d of the grooves 30, 31. FIG. 2 shows a pair of tools 20a, 20b mounted on a single arbor and spaced at a predetermined distance to provide an adequate land surface 90 separating the grooves 30, 31. More or fewer tools can be used, depending on the width of the plank.

Figure 5:
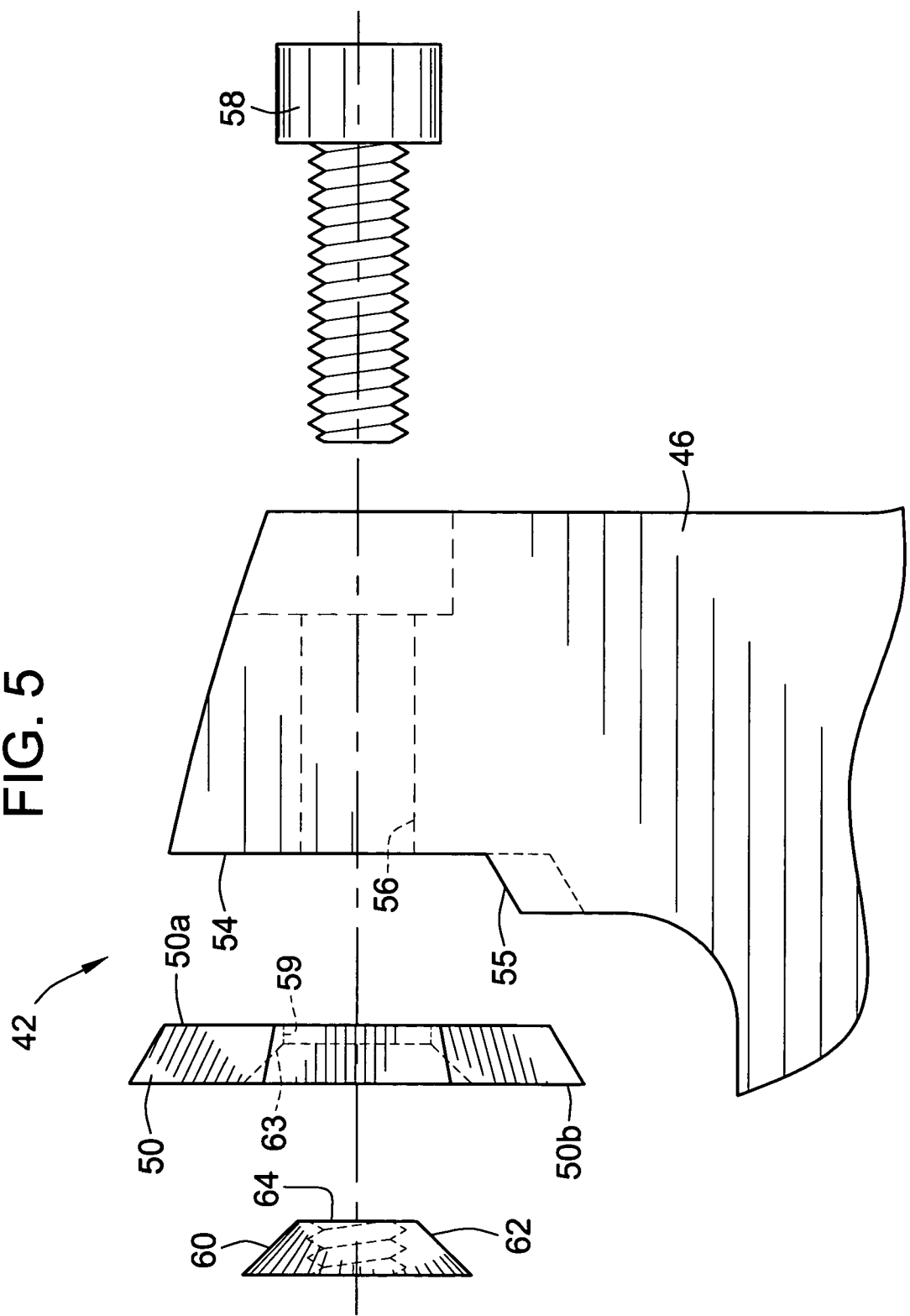
FIG. 5 is an enlarged fragmentary view showing the mounting of a single cutting insert on a portion of the tool of FIG. 1.

Returning to FIG. 1, it will be seen that the tool 20 is based on a generally cylindrical tool body 40 having a center aperture 41 adapted to be locked to the arbor 24. The particular shape of the tool body is not important, except that it provides a plurality of positions generally indicated at 42 for supporting cutting inserts 50. The inserts 50 have one side 50a which is supported on a flat supporting surface 54 of the tool body (see also FIG. 5). Accurate positioning of the insert is enhanced by locating ledges 55 which engage two of the edges of the cutting insert for accurately positioning the insert with respect to the tool body. These ledges 55 assist in defining the indexed positions of the inserts. The body, at each of the tool mounting positions 42 includes a through bore 56 which accepts the threaded fastener, preferably in a form of a cap screw 58 which projects the through bore 56 and seats in the central aperture 59 in the insert.

In contrast to prior tools where it is conventional to utilize the threaded fasteners penetrating the insert from the insert face, and threaded into the tool body, and according to the present invention, the aperture 56 is unthreaded, configured as a clearance hole for the fastener 58, and a special threaded nut 60 is provided for mating with the unsupported dished face 50b of the insert to lock the insert in position. In this way, the head 58a of the threaded fastener is protected from impacted cutting debris which would collect in the socket of a cap screw if a more conventional mounting were used. It would be appreciated that the tool rotates counter clockwise as shown in FIG. 1, and that the leading edges of the insert, machines wood from the plank. If the head of the cap screw were projecting through the insert so that rotation of the tool forced machining debris into the head of the cap screw, accessing the cap screw to re-index the inserts would be difficult. Machining debris from wood is well known to include not only sawdust but gummy residue which can collect in and over time harden in crevices into which it is forced. By using a reverse mounting as taught in the present invention, the cap screw is not in a position to have machining debris forced into it, but by virtue of the rotation of the tool, is, in effect, shielded from machining debris. Plus, when it is desired to change inserts or to index the inserts, it would be relatively easy for the operator to generally blow or brush the dust away from the tool, then to insert the appropriate hand tool into the socket of the cap screw to loosen the cap screw for indexing of the insert.

This accomplished in part by provision of a special nut 60 having a dished face 62 which matches a dished face 63 on the face of the insert. Thus, to mount and insert to the tool (see particularly FIG. 5), the insert 50 is inserted into the position 42 with the ledges 55 supporting the associated cutting faces. The nut 60 is then placed in the dished face 63 of the insert, and the cap screw 58 inserted through the apertures 56 of the tool and 59 of the insert, to engage the threaded aperture 64 of the nut 60. Tightening of the cap screw then securely locks the insert into its currently indexed position. While a cap screw is preferred, other forms of fasteners can be used if desired.

Figure 4:
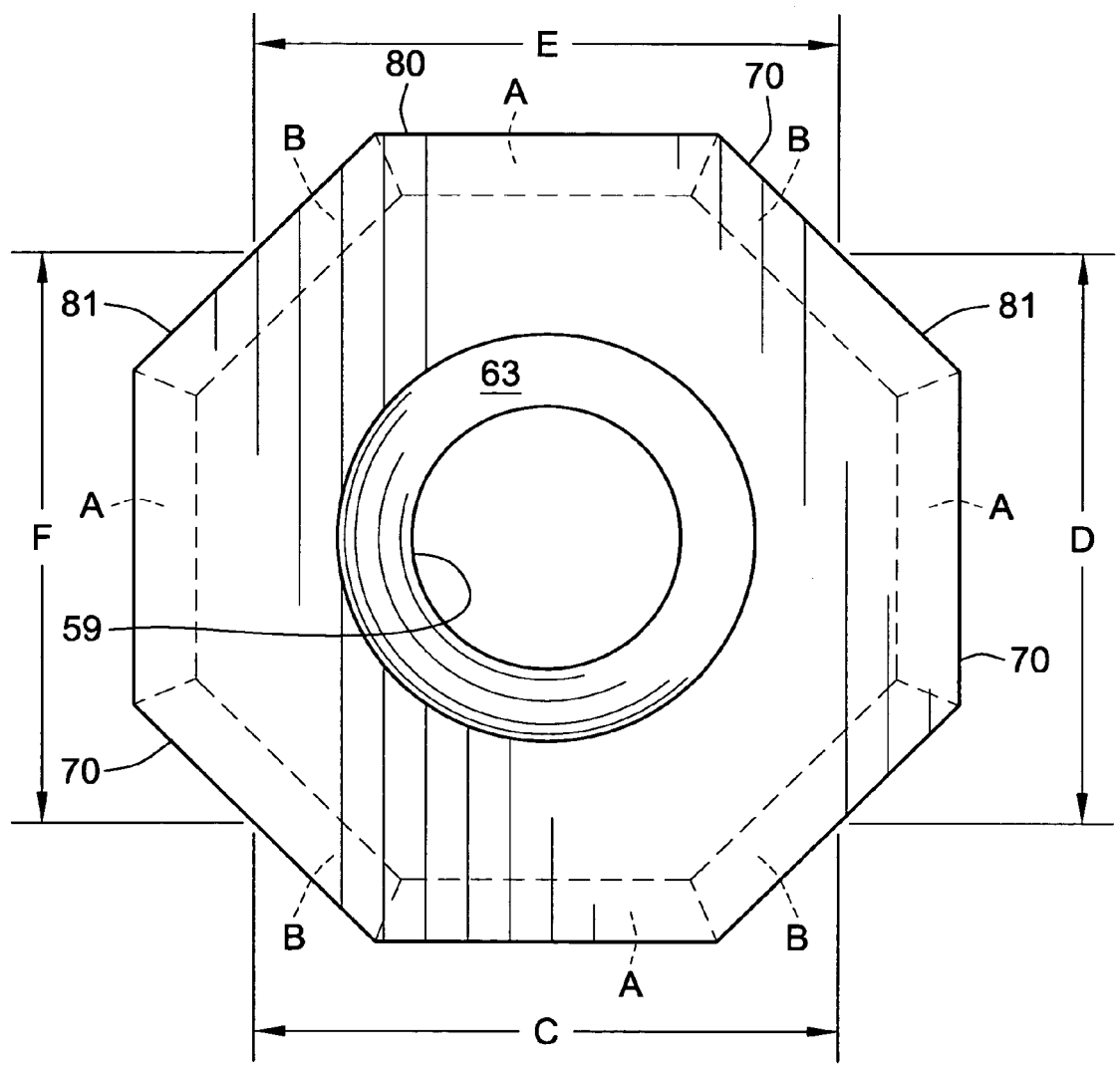
FIG. 4 is an enlarged view of the cutting insert showing a plurality of cooperating cutting edges.

The configuration of the insert itself will be better understood with reference to the enlarged view of FIG. 4. It will be seen that the insert 50 is formed as a regular octagon having eight identical cutting edges 70. Each edge is formed in conventional fashion with a hard cutting edge 70 tapered backwardly at angles to provide a tool which aggressively removes stock from a plank while avoiding splitting and chipping, and is also configured for long wear. The details of the tool angles are not important to an understanding of the present invention.

As noted, the tool 50 is formed as a regular octagon having sides (cutting edges) of equal length. That requires that the cutting edges 70 are relatively displaced by 45 degrees. What is meant, is that each edge is rotated 45 degrees with respect to the previous edge, such that the horizontal cutting edge 80 of the tool of FIG. 4 is flanked by a pair of edges 81, each rotated 45 degrees from the horizontal orientation of the edge 80. The same orientation holds true for each of the edges, of course.

The interrelationship between the tool and the flooring plank workpiece will better help to understand the tool geometry. Thus, referring to the left most cutting insert 50 of FIG. 2, it will be seen that the lower cutting edge identified by the reference numeral 85 is oriented to form the flat bottom 32 of the groove 30. It is the cutting edge 85 that is flanked by a pair of cutting edges 86 which then cut 45 degrees groove side walls 33, 34. For ease of discussion, we will adopt a convention whereby the octagonal tool 50 is considered to have A-edges (such as cutting edge 85 in FIG. 2) positioned to cut the flat bottom of a groove, and B-edges (cutting edges 86 in FIG. 2) positioned to cut 45 degrees side walls. Thus, it will be seen that the octagonal tool has a plurality of cutting edges comprising A-edges alternating with B-edges. This convention is applied to FIG. 4 where the letters A and B are associated with the respective cutting edges in the orientation of the insert shown in FIG. 4. It will also be apparent that the insert of FIG. 4 can be rotated 45 degrees and the A and B edges will change orientation. However, what is important for the present discussion is simply the fact that there are alternating edges (arbitrarily called A-edges and B-edges) and that the cutting edges are assigned particular functions when an insert is mounted and the tool in a fixed indexed position.

In practicing one aspect of the invention, the insert 50 is sized and configured so as to provide four independent sets of cutting edges to the insert, so that it can be indexed into four positions for cutting. It will first be appreciated that the grooves 30 which are to be formed in the backs of the flooring planking are to be of at least a predetermined depth d (see FIG. 3). If the insert is made relatively small in order to cut relatively narrow grooves, it will be appreciated that when the tool is indexed to cut grooves of a particular depth d, the adjacent B-edges (86 of FIG. 2) would be engaged in the plank well past their mid point. Thus, the edges 86 which would be cutting the 45 degree side walls in FIG. 2 would be worn over more than 50% of their length, making those edges ineffective for use in a subsequent cut. In accordance with the invention the insert 50 is sized in such a way that when the tool is oriented with respect to the workpiece (by relative adjustment of the table 27 with respect to the arbor center 25) the tool is capable of cutting a groove to the predetermined depth d while engaging no more than a 50% of the adjacent B-edges 86 in the workpiece. Thus, the remaining 50% of the B-edges 86 is available for cutting side walls when the next adjacent A-edge (88, 89 in FIG. 2) are indexed. This is best illustrated in FIG. 4 by bracketing the A and B cutting edges into cutting sets identified as sets C, D, E, and F. Thus, for example, when the insert 50 of FIG. 4 is indexed in the tool to a position shown in FIG. 4, the tool set C will be the operative tool set and will utilize the lower most cutting edge A to form the flat bottom of the groove and no more than 50% of the adjacent cutting edges B to form the 45 degree side walls. When the edges are worn and the insert 50 is indexed, to utilize for example the cutting set F, the unused 50% of the right hand cutting edge B will be available for cutting side walls for that set of grooves. The insert is thus provided with four completely independent sets of cutting edges for forming the grooves illustrated best in FIG. 3.

The ability to utilize the indexable insert 50 in four positions combined with the "protected" form of index mounting which makes re-indexing the inserts less troublesome, provides an overall tool which is suited to very high volume production of flooring planks, substantially enhancing the ease, convenience and accuracy of that operation in an important industry.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cutting tool for forming flat bottomed grooves in the backs of flooring planks, the tool comprising in combination:
    a tool body having a plurality of positions for supporting cutting inserts;
    a plurality of cutting inserts supported on the tool body in said positions;
    each cutting insert:
        (a) being shaped as regular octagon having eight identical cutting edges relatively displaced by 45 degrees and having A-edges alternating with B-edges,
        (b) being arranged such that when it is indexed in the tool body with an A-edge positioned to cut the flat bottom of a groove, each of the adjacent B-edges is oriented to cut a 45 degree groove sidewall,
        (c) having a conical dished face on the unsupported side of the insert, and an aperture in dished face projecting through the insert,
    a matching conical-faced nut positioned in the dished face of the insert, and a threaded fastener projecting through the tool body, the insert and into the nut to accurately lock the insert to the tool body in indexed position, the threaded fastener being releasable to allow the tool to be re-indexed.

2. The cutting tool of claim 1 wherein the groove in the back of the flooring plank is to be of a given depth, and wherein the insert is of sufficient dimension that when an A-edge is positioned to cut a flat bottomed groove of said predetermined depth, the cutting edges of the adjacent B-edges are engaged in the plank by no more than fifty percent (50%) of their length, whereby the insert is provided with four indexable cutting positions.

3. The cutting tool of claim 1 including locating ledges on the tool body for assisting in defining the indexed positions of the insert.

4. The combination of claim 2 wherein the threaded insert is a cap screw and by virtue of its orientation on the side opposite the tool body from the cutting insert is positioned to minimize collection of cutting debris in the socket of the cap screw.

5. For use with a cutting tool which forms flat bottomed grooves in the backs of flooring planks, a cutting insert and mounting arrangement comprising in combination:
    an octagonal cutting insert:
        (a) being shaped as a regular octagon having eight identical cutting edges relatively displaced by 45 degrees and having A-edges alternating with B-edges,
        (b) the cutting insert being arranged such that when it is oriented with an A-edge positioned to cut the flat bottom of a groove, each of the adjacent B-edges is oriented to cut a 45 degree groove side wall,
        (c) a conical dished face on an unsupported side of the insert and an aperture in the dished face projecting through the insert,
    a mounting nut having a conical face which fits within the dished face of the insert with a threaded portion of the nut adjacent the aperture in the insert; and
    a threaded fastener which projects through an aperture in the tool body, through the aperture in the insert and threads into the nut to accurately lock the insert in indexed position, the threaded fastener being releasable to allow the tool to be re-indexed.

6. The combination of claim 5 wherein the threaded insert is a cap screw and by virtue of its orientation on the side opposite the tool body from the cutting insert is positioned to minimize collection of cutting debris in the socket of the cap screw.

7. The combination of claim 5 wherein the groove in the back of the flooring plank is to be of a given depth, and wherein the cutting edges of the insert are sufficiently short to leave adequate bottom surface on the underside of the plank, yet sufficiently long that when the A-edge is positioned to cut a flat bottomed groove of said predetermined depth, the cutting edges of the B-edges are engaged in the plank by no more than 50% of their length, whereby the insert is provided with four indexable cutting positions.

8. A method of cutting flat bottomed grooves in backs of flooring planks, the method comprising the steps of:
    providing a tool body having a plurality of positions for supporting cutting inserts,
    mounting cutting inserts in said positions of the tool body, each cutting insert:
        (a) being shaped as a regular octagon having eight identical cutting edges spaced at 45 degrees and having A-edges alternating with B-edges,
        (b) the cutting insert being arranged such that when it is oriented with an A-edge positioned to cut the flat bottom of a groove, each of the adjacent B-edges is oriented to cut a 45 degree groove side wall,
        (c) a conical dished face on the unsupported side of the insert and an aperture in the dished face projecting through the insert,
    securing the cutting inserts to the tool by means of a threaded fastener projecting through an aperture in the body of the tool, through the aperture in the insert, and into a conical faced nut positioned in the dished face of the insert;

rotating the tool body and creating relative motion between the tool body and flooring planks to be grooved such that the A cutting edge in indexed position cuts a flat bottomed groove and with the adjacent B-edges engaged in the plank at no more than out 50% of their cutting length;

when the active cutting edges are worn, indexing the tool; and repeating the indexing step to utilize four sets of cutting edges.

* * * * *